United States Patent [19]

Sturm et al.

[11] 4,094,721
[45] June 13, 1978

[54] PARTIALLY CRYSTALLINE COPOLYESTERS USEFUL AS ADHESIVES

[75] Inventors: Karl Günter Sturm, St. Augustin; Klaus Brüning, Bergisch-Gladbach, both of Germany

[73] Assignee: Dynamit Nobel Aktiengesellschaft, Troisdorf, Germany

[21] Appl. No.: 596,048

[22] Filed: Jul. 15, 1975

[30] Foreign Application Priority Data

Jul. 25, 1974 Germany .............................. 2435863

[51] Int. Cl.² .............................................. C09J 5/00
[52] U.S. Cl. .................................... 156/309; 156/332; 260/75 R; 260/75 T; 428/480
[58] Field of Search ............... 156/332, 291, 309, 320, 156/283, 322; 427/195, 288, 22 A, 390 R; 28/73; 12/142 F; 36/19.5; 428/200, 290, 237, 327, 246, 473, 261, 480, 287, 283; 260/75 R, 75 T

[56] References Cited

U.S. PATENT DOCUMENTS

| | | | |
|---|---|---|---|
| 2,876,725 | 3/1959 | Buck et al. | 156/332 |
| 3,232,813 | 2/1966 | Newton | 156/322 |
| 3,436,301 | 4/1969 | McHale | 156/332 |
| 3,515,628 | 6/1970 | Jackson et al. | 156/332 |
| 3,674,592 | 7/1972 | Jacobson et al. | 156/283 |
| 3,699,187 | 10/1972 | Gardziella | 156/332 |
| 3,850,725 | 11/1974 | Spielau et al. | 156/291 |
| 3,890,186 | 6/1975 | Blaschke et al. | 156/332 |
| 3,926,920 | 12/1975 | Georgoudis et al. | 260/75 R |

Primary Examiner—David Klein
Assistant Examiner—J. J. Gallagher
Attorney, Agent, or Firm—Burgess, Dinklage & Sprung

[57] ABSTRACT

A linear saturated crystalline polyester of an acid moiety and a moiety of a dihydric alcohol, at least 40% of the acid moiety being a terephthalic acid moiety, said polyester containing moieties of 1,4-butanediol and 1,6-hexanediol, the ratio of the 1,4-butanediol moieties to 1,6-hexanediol moieties being 10:90 to 90:10; the use of such polyesters as a fusion coating mass, particularly in securing textile substances to a substrate.

24 Claims, No Drawings

PARTIALLY CRYSTALLINE COPOLYESTERS USEFUL AS ADHESIVES

BACKGROUND OF THE INVENTION

1. Field of the Invention

This invention relates to a linear saturated crystalline polyester. This invention is particularly directed to a linear saturated crystalline polyester which has a low melting point in the range of 40°–130° C, a glass transition temperature in the range of −10° C to +30° C, and a maximum logarithmic damping decrement from 0.6 to >1.3, the difference between the glass transition temperature and the melting temperature being equal to or less than 100° C. This invention is particularly directed to a crystalline polyester which can be employed as a fusion adhesive in securing textile substrates together, which substance is resistant to dry cleaning solvents. This invention is also directed to a process of securing substances to one another by the use of the fusion coating mass of this invention.

DISCUSSION OF THE PRIOR ART

It is known to use as fusion adhesives copolyesters of terephthalic acid and isophthalic acid in a molar ratio of 70:30 to 90:10, and straight-chained glycols whose hydroxyl groups are on terminal carbon atoms, the carbon chain of the glycol containing from 2 to 10 atoms (German Pat. No. 1,103,489). The temperature difference between the melting point and the glass transformation temperature of the copolyester amounts to at least 100° C. The melting points are at 170° to 200° C.

The use of polyesters with a melting point of 160° to 220° C, which are composed of terephthalic acid plus, in some cases, isophthalic acid, and one or more glycols having 2 to 10 carbon atoms, and which contain 0.01 to 0.03 wt.-% of an inorganic powder with a grain size smaller than 5 microns, for the cementing of objects by the fusion adhesive method, is known from German "Auslegeschrift" 1,912,117. See also U.S. Pat. No. 3,853,665. Ethylene glycol, propylene glycol, butylene glycol, pentanediols or hexanediols are proposed as the glycols. As glycol mixtures, those mixtures are used which contain ethylene glycol, examples being ethylene glycol plus 1,6-hexanediol or ethylene glycol plus 1,4-butanediol.

Such copolyesters have the disadvantage that they have relatively high melting points. They are therefore usable to only a limited extent as coating substances to be applied in the molten state or as fusion adhesives for heat-sensitive materials.

Copolyesters generally have lower melting points than homopolyesters. For example, the melting point of a polyester of terephthalic acid and ethylene glycol is around 260° C. A polyester consisting of 90 mol-% of terephthalic acid and 10 mol-% of isophthalic acid, in which ethylene glycol has been used as the diol component, has a melting point of 236° C. When the molar ratio of terephthalic acid to isophthalic acid is 80:30, a copolyester is obtained which has a melting point of 210° C. When the ratio of terephthalic acid to isophthalic acid is 70:30, the melting point drops to 185° C.

Conditions are similar when the ethylene glycol is replaced by butanediol-1,4. A polybutyleneterephthalate comparable to the polyethyleneterephthalate, however, has a melting point of 225° C.

As indicated by Tables 1 and 2 below, the degree of crystallization decreases considerably as the melting point decreases and the co-acid content increases. Copolyesters on the basis of terephthalic acid plus isophthalic acid, in which ethylene glycol or butanediol-1,4 are used as the diol component, and which have melting points equal to or less than 130° C already possess so little crystallinity, if they are not completely amorphous, that they are virtually usuable as fusion adhesives or coating substances. Substrates coated with such copolyesters in many cases do not lose their surface stickiness for days if they lose it at all.

In German "Offenelegungsschrift" No. 1,920,432 there is disclosed a dry-cleaning-fluid resistant polyester fusion adhesive prepared from (1) terephthalic acid and ethylene glycol, (2) adipic acid and 1,4-butanediol. The molar ratio of terephthalic acid to adipic acid ranges from a predominance of terephthalic acid to a predominance of adipic acid, and the molar ratio of ethylene glycol to 1,4-butanediol ranges from a predominance of ethylene glycol to a predominance of 1,4-butanediol. Such polyesters are used for the cementing of textiles. The copolyester prepared in accordance with Example 1 has a softening point of 135° C.

This softening point, however, is still too high for many heat-sensitive materials which are to be laminated or are to be provided with a melted or sintered coating, such as artificial leather, natural leather, etc. If the molar ratios of the individual components of these copolyesters are varied, it is indeed possible to arrive at a copolyester having a softening point of 110° C and a glass point of 6° C. (Terephthalic acid:adipic acid molar ratio 60:40, ethylene glycol:butanediol-1,4 molar ratio 60:40).

The degree of crystallization of this copolyester, however, is already so low (damping decrement greater than 2) that it is not suitable for a fusion adhesive. Disadvantages reside in both the surface stickiness of the coated substrates and the stickiness of the copolyester as such, which is considerable even at room temperature. Copolyesters of this type are not suitable for the preparation of coating substances in powder form or adhesives in powder form, such as are required, for example, in the textile field. Another deficiency of a copolyester of a terehthalic acid-adipic acid-ethylene glycol-butanediol-1,4 copolymer with a melting point at 130° C or less lies in its low melt viscosity.

An excessively low viscosity in the melt is especially disadvantageous whenever a sandwich, in whose preparation the known copolyesters are used as fusion adhesives, has to be heated briefly above the melting point of the fusion adhesive during its further fabrication. This is the case, for example, in shoe manufacture. In the manufacture of shoes, a thermoplastically deformable synthetic material is used as a stiffening cap. This material, preferably in the form of long strips, is coated with a fusion adhesive. After the fusion adhesive has solidified, the stiffening cap blanks are stamped out and are bonded to the shoe upper material under the simultaneous action of heat and pressure. In a further operation, the adhesive coated inner lining of the shoe is likewise cemented under the action of heat and pressure to this sandwich, so that the stiffening caps are disposed between the inner lining of the shoe and the shoe upper material. The shaping of the shoe upper is preferably performed simultaneously with the application of the shoe inner lining material. During the application of the shoe inner lining material, the stiffening cap or stiffening cap blank, as the case may be, must not shift, much less become separated from the shoe upper material.

Also in the lasting process that follows, in which the shoe upper material is cemented to the in sole by the use of fusion adhesives and the simultaneous application of heat and pressure, no shifting or separation of the inner lining from the upper material must take place.

An excessively low viscosity in the melt is disadvantageous also in textile lamination. In this case the object is to bond a facing material to a lining material such that the laminate will retain the textile character. Fusion adhesives in powder form are preferred in textile lamination. The powders are sintered onto the lining matrials, usually woven fabrics, by means of special applicator systems, and then cemented to the facing materials with the application of heat and pressure. Adhesives which are resistant to dry cleaning agents are needed as the adhesives.

Accordingly, it became desirable to provide a polyester adhesive fusion coating mass which was crystalline, had a melting point less than 130° C and which resisted the action of dry cleaning solvents. It became desirable to provide such a polyester based upon terehthalic acid alone or in admixture with another dicarboxylic acid such as isophthalic acid. Moreover, it became desirable to provide a polyester having a substantial melt viscosity, say in the range of 100-20000 poises.

SUMMARY OF THE INVENTION

Objects of this invention are provided by a linear saturated crystalline polyester of an acid moiety and a moiety of a dihydric alcohol, at least 40% of the acid moiety being terephthalic acid moieties, said polyester containing moieties of 1,4-butanediol and 1,6-hexanediol, the ratio of 1,4-butanediol moieties of 1,6-hexandediol moieities being 1:90-90:10.

It has been found that linear saturated crystalline polyesters derived from terephthalic acid and a mixture of 1,4-butanediol and 1,6-hexanediol have good crystallinity notwithstanding melting points of 40°-130° C. Such polyesters, moreover, have a glass transition temperature of −10° C to +30° C, a maximum logarithmic damping decrement from 0.6 to >1.3 and a reduced viscosity, measured on a 1 wt.-% solution in a 60-40 mixture of phenol and 1,1,2,2-tetrachloroethane of 0.5 to 1.5. The difference between the glass transition temperature and the melting temperature of such polyesters is equal to or less than 100° C. Such polyesters have good viscosities in the melt and resist the action of dry cleaning solvents. They can be employed as fusion coating masses in various forms, either in the form of heated molten masses or in the form of solids. As solids, they can be employed in the form of strips or in the form of powders. They are highly useful as solvent-free adhesives and satisfy the requirements imposed by the textile and shoe industries.

It is surprising that the thermoplastic polyesters of the invention have good crystallinities in spite of their low melting points, since it was to be expected that the polymers would be amorphous or would, at best, have such low crystallinities that they would nevertheless be useless as fusion adhesives which resist the action of dry cleaning solvents. However, the polyesters of the invention resist those dry cleaning agents commonly employed. Thus, the copolyesters of the invention can be characterized as having a solubility in 1,1,2,2, Tetrechlorolethylene of less than 0.3%, determined at 25° C.

The copolyesters of the invention contain terepthalyl acid moieties. These "terepthalyl moieties" can be supplied by the usual terephthalyl moiety sources, e.g., terephthalyl acid, terephthalyl chloride and the mono- and dialkyl esters of terephthalic acid. Thus, the term "terepthalyl moiety" or "terepthalyl acid moiety" is to be considered as including those moieties supplied by the acid chloride or a mono- or diester. The polyester contains terephthalic acid in an amount of at least 40 mol %, based upon the acid moieties. Stated differently, the copolyester of the invention is a terepthalyl acid copolyester in which from 1 to 60 molpercent of terepthalyl acid moieties are replaced, if desired, by a second acid moiety.

If a portion of the terephthalic acid moiety is replaced by a second acid moiety, it is replaced by a saturated aliphatic dicarboxylic acid having terminal carboxylic acid groups having from 4 to about 34 carbon atoms between the two carboxyl groups. Preferably, the saturated aliphatic dicarboxylic acid contains between 4 and 8 carbon atoms between the carboxyl groups. Examples of aliphatic dicarboxylic acids contemplated include adipic, azelaic or sebacic acid or mixtures thereof. Alternatively, 1 to 60 mol % of the terephthalic acid content can be replaced by isophthalic acid. As a third alternative, a portion of the terphthalic acid content can be replaced by an isophthalic acid moiety or a moiety of one or more saturated aliphatic dicarboxylic acids.

The diol component of the copolyesters of the invention preferably comprises a mixture of 1,4-butanediol and 1,6-hexanediol where the combined quantities of these diols constitute all of the diol component.

In some cases, one or more additional saturated aliphatic diols having 2 to 12 carbon atoms can be incorporated by condensation in addition to the 1,4-butanediol and 1,6-hexanediol. In such cases, the third diol is present in an amount up to 20 mol % based upon the total diol component. The third diol can also be a branched diol. The hydroxyl groups are preferably attached to the terminal carbon atoms. Examples of diols particularly contemplated include ethylene glycol, propanediol-1,3, pentanediol-1,5 and neopentyl glycol.

With respect to the aliphatic or the named aromatic dicarboxylic acids polyester forming derivatives can be used in the preparation of the polyester, especially the mono- or dialkyl esters of the named dicarboxylic acids, especially $C_1$-$C_4$ mono- or dialkyl esters, particularly the dimethyl esters.

Copolyesters having the following characteristics are used preferentially, in accordance with the invention, as solvent-free fusion adhesives or as solvent-free coating substances, e.g., coating substances in powder form or heatsensitive materials:

A. A glass transition temperature of −10° to +30°.C;

B. A melting point from 40° C to 130° C, preferably between 55° and 115° C;

C. A difference between the glass transition temperature and the melting temperature of equal to or less than 100° C, preferably between 25° and 90° C;

D. A maximum logarithmic damping decrement between 0.6 and >1.3, preferably between 0.75 and 1.15; and E. A reduced viscosity, measured on a 1 wt.-% solution in a 60-40 mixture of phenol and 1,1,2,2-tetrachloroethane, of 0.5 to 1.5, preferably 0.7 to 1.2.

DESCRIPTION OF PREFERRED EMBODIMENTS

The melt viscosity of the copolyesters of the invention, including those having melting points above 130° C, are approximately between 100 and 20,000 poises measured on the Contraves "Rheomat 15" rotary viscosimeter equipped with the "Viskotemp" accessory, at 200° C. Those copolyesters of the invention having melt viscosities of 300 to 10,000 poises are preferred.

Suprisingly, the copolyesters of the invention behave differently from the previously known thermoplastic copolyesters derived from terephthalic acid, with regard to their crystallization behavior. It had previously been held that the difference between the glass temperature and the melting temperature would have to be at least 100° C, since otherwise the copolyester is amorphous or its crystallinity is so low that it has a damping decrement greater than 2. Amorphous copolyesters cannot be used as fusion adhesives in which resistance to dry-cleaning agents and high setting speed are required. In like manner, those polyesters are undesirable which have too little crystallinity, because they solidify too slowly and consequently do not lose their surface stickiness for days or in manycases even weeks. The copolyesters of the present invention generally have a crystallinity corresponding to a damping decremented of at least 1.8, preferably a damping decrement of 0.75 to 1.15.

It has been found that the copolyesters of the invention having damping decrements ranging from 0.6 to 1.3 are especially well suited as fusion adhesives.

As Table 3 shows, the copolyesters used preferentially in accordance with the invention have the desired degrees of crystallization, although the difference between the glass temperature and the melting point is 100° C or less.

Surprisingly, even copolyesters prepared from terephthalic acid and isophthalic acid in a molar ratio of 50:50 and butanediol-1,4 and hexandediol-1,6 in a molar ratio of 50:50 will crystallize even though the difference between their melting temperature of 51° C and their glass temperature of 13° C amounts to only 38° C.

The copolyesters of the invention have many advantages over the previously known thermoplastic, linear, saturated copolyesters derived from terephthalic acid. For example, one can prepare copolyesters having the same or nearly the same melting point but different speeds of solidification. Particularly copolyesters of the invention having melting points of 40° to 130° C represent an enrichment of the art. They are used as solvent-free coating substances for coating heat-sensitive materials or for cementing together heat-sensitive materials such as leather to leather, leather to plastic, leather to wood, plastic to plastic, and the like.

They are especially suitable for the preparation of laminated materials for outer clothing. They can also be used to advantage in shoe manufacture as special adhesives, for example in the manufacture of lined shoe uppers combined, in some cases, with toe caps. In the textile field it is especially advantageous that they are resistant to dry-cleaning agents, and they can be applied in powder form to a heat-sensitive material such as a woven fabric, for example. Upon being heated to the activation temperature the particles are sintered and adhere to the fabric. A punctiform application of this kind has the advantage that when the fabric thus coated is cemented to another textile material, for example by means of an ironing machine, it retains the textile character and the desired "breathing" activity.

The copolyesters of the invention having melting points of 100° to 130° C are especially well suited for the manufacture of laminates for textiles, in which an especially good resistance to dry-cleaning agents is required.

Furthermore, these special copolyesters are particularly suitable for the manufacture of powders of long shelf life. They also have the advantage that the powders do not prematurely cake up on the equipment used for working them — in the feed hoppers for example — but retain their free-flowing qualities. Generally speaking, when the polyester is employed in the form of a free-flowing powder, the powder has a particle size between 1 and 500 mm, preferably between 60 and 300.

However, if desired, the copolyesters of the invention can be applied to substrates while in the molten state if desired.

Simultaneously with their application, or in a later procedure, the coatings can be patterned, by means of appropriate embossing rolls for example for the achievement of decorative effects. The amount of copolyester to be applied is governed essentially by the particular application or by the kind of substrate used.

The copolyesters of the invention also have the advantage that on the one hand they can be fabricated thermoplastically at relatively low temperatures, but on the other hand they have good stability of shape under brief thermal stresses above their melting points. This advantageous characteristic is particularly desirable in cases in which a laminate consisting, for example, of two or more plies, in the manufacture of which a copolyester of the invention has been used as the adhesive with a melting point ranging between 40° and 130° C, is to be cemented to another laminate by the use of an adhesive whose melting point is above 130° C, e.g, a melting point of 190° C, with the application of heat and pressure. The copolyesters of the invention have a high melt viscosity and adhesive strength even above their melting points, so that the individual plies of the laminate will not shift on one another, much less come apart from one another, during the adhering process or after the pressure has been removed.

Materials coated with the copolyesters of the invention, such as boards, shaped objects, webs and the like, can bestacked or stored at normal room temperature without use of interleafing to facilitate separation, due to their non-sticky surface.

The preparation of the partially crystalline copolyesters of the invention can be performed in a conventional manner. For example, the method of preparation can be similar to that of polyethylene terephthalate. There follows a description of a typical mold for preparing the copolyester of the invention. Other techniques can be used where the terephthalic acid moiety is supplied by terehthalic acid itself rather than from an ester. In some cases, direct esterification can be employed. Those of skill in the polyester art well known the manipulative procedures whereby polyesters and copolyesters of terephthalic acid and dihydric alcohols can be employed. The manipulative procedure by which the copolyesters of the invention are prepared does not differ. The polyesters of the invention owe their characteristics owing to the specific components of the polyester, especially the butanediol-1,4 and hexanediol-1,6. Additionally, the relative amounts of these components determine the characteristics of the resultant polyester.

In an autoclave provided with a stirrer, for example, dimethylterephthalate and dimethylisophthalate can be esterified in a molar ratio of 90:10, for example, with a mixture of butanediol-1,4 and hexanediol 1,6 (in a molar ratio of 35:65 for example) in the presence of a transesterification catalyst such as tetra n-butyltitanate and, if desired, zinc acetate dihydrate. The acid component and diol component can be used in equimolar amounts; preferably, excess amounts of the diol component are used, e.g., a diol to acid moiety mol ratio of 1.1:1.6, preferably 1.2:1.4.

At an internal temperature of about 150°–200° C, the methanol is distilled out at normal pressure. After injecting triphenylphospite with a small amount of diol, for the purpose of inhibiting the transesterification catalyst, the autoclave is evacuated and the internal temperature is raised to 270° C. After about an hour the pressure is reduced to less than one Torr, and after an additional 3 to 4 hours of stirring, the vacuum is broken by the introduction of nitrogen, and the contents of the autoclave are removed through the bottom valve and granulated.

The fusion adhesives or coating substances prepared on the basis of the copolyesters of the invention can contain, if desired, conventional additives such as, for example, suitable leveling agents, pigments, or finely powdered inorganic additives having grain sizes under 5 microns, plus antistatic agents, flameproofing agents and the like, as desired. After preliminary preparation in a high-speed mixer, for example, the mixtures can be homogenized by means of an extruder or kneader at, for example, 180° C.

The copolyesters of the invention, containing conventional additives, if desired, can be pulverized in baffleplate mills, disintegrators or air blast mills with the material deep-frozen. Powders suitable for powder coating are especially those which have grain sizes ranging approximately between 50 and 500 microns.

The melting point of the copolyesters of the invention is given as the melting maximum of the differential-thermocalorimetry (DSC-1, Perkin-Elmer, heating rate 16° C/min).

The maximum logarithmic damping decrement λ at the glass temperature Tg of the torsional vibration analysis is given as the index of the degree of crystallization. The lower λ is, the higher is the degree of crystallization. Hence, λ is at least 1.8, preferably 0.75 to 1.15.

The reduced viscosity, measured on a 1 wt.-% solution in a mixture of 60 wt.-parts of phenol and 40 wt.-parts of 1,1,2,2-tetrachloroethane at 25° C is given as the index of the molecular weight, and it is calculated according to the following formula:

$$n_{red} = \frac{\frac{t_L}{t_{LM}} - 1 \, [dl/g]}{c}$$

wherein $t_L$ is the pouring time of the solution, $t_{LM}$ is the pouring time of the solvent, and $c$ is the concentration in grams per 100 ml.

In order to more fully illustrate the nature of the invention and the manner of practicing the same, the following examples are presented.

EXAMPLE 1

A copolyester in whose preparation terephthalic acid and isophthalic acid were used in a molar ratio of 50:50, and butanediol-1,4 and hexanediol-1,6 were used in a molar ratio of 50:50, which had a reduced viscosity of 0.72, a glass transition temperature of 13° C, and melting maximum of 56° C, was heated at 180° C and by means of a roller applicator was applied to the back of a synthetic shoe inner lining material containing PVC, which is commercially available under the name "Tropor." After one day of standing, the surface of the polyester was entirely free of stickiness, so that no paper interleafing was required. The shoe inner lining thus coated could be cemented to the shoe upper material by means of a hot pressing system without damage to the heat-sensitive PVC surface, since a temperature of only 80° C was required for a period of 10 seconds.

The shoe lining cemented in this manner withstood the "lasting procedures," as they are called, in which adhesives with mass temperatures between 180° and 220° C were applied to the upper material, and in which no shifting or separation of the lining must take place.

EXAMPLE 2

(For Purposes of Comparison)

A copolyester in whose preparation terephthalic acid and isophthalic acid had been used in a molar ratio of 25:75, and butanediol-1,4 had been used as the diol component, and which had a reduced viscosity of 0.81 and a glass temperature of 30° C, was no longer capable of crystallization. The material underwent cold flow at room temperature and had a sticky surface. The material was not suitable for the coating of shoe linings.

EXAMPLE 3

(For Purposes of Comparison)

A copolyester in whose preparation terephthalic acid, isophthalic acid and azelaic acid had been used in a molar ratio of 25:50:25, and butanediol-1,4 had been used as the diol component, and which had a reduced viscosity of 0.91, a glass temperature of −5° C and a melting point of 60° C, still displayed a slight crystallinity (λ greater than 1.3).

In the coating of shoe lining material, the coating lost its surface stickiness after standing for three days. The shoe lining could be adhered to the upper material by the simultaneous application of heat and pressure (80° C for 10 seconds). In the lasting process that followed, however, the adhesive softened excessively so that the lining separated from the upper leather (melt viscosity too low).

EXAMPLE 4

A molten copolyester in whose preparation terephthalic acid and isophthalic acid had been used in a molar ratio of 70:30 and butanediol-1,4 and hexanediol-1,6 had been used in a molar ratio of 50:50, and having a reduced viscosity of 0.76, a glass temperature of 19° C and a melting point of 83° C as well as a logarithmic damping decrement of 1.15, was applied to a thermoplastically formable material such as is used in making stiffening caps in the manufacture of shoes (e.g., a hard paper prepared from a styrene-butadiene copolymer) (mass temperature 180° C). Within about 5 minutes the coating was entirely free of stickiness. The stiffening caps or stiffening cap blanks, as the case may be, could be stacked without being interleafed with separating papers. The punched-out stiffening cap blanks could be bonded to a shoe upper material by the application of pressure at 130° C for 5 seconds, for example. In the subsequent process of the cementing of the lining and in the lasting process no shifting or separation of the caps took place.

EXAMPLE 5

(For Purposes of Comparison)

A copolyester in whose preparation terephthalic acid, isophthalic acid and azelaic acid had been used in a molar ratio of 40:40:20 and butanediol-1,4 had been used as the diol component, and which had a reduced viscosity of 0.70, a glass temperature of +5° C and a melting range of 49° to 127° C with maxima at 62° C and 92° C, was applied in molten form to a synthetic stiffening material as described in Example 4.

In about half an hour the coating lost its surface stickiness. The cementing could be performed under the same circumstances as described in Example 4.

However, the subsequent cementing-in of lining materials in presses whose temperature exceeds 70° C was not possible, since the stiffening caps separated or shifted.

EXAMPLE 6

A copolyester of the invention, in whose preparation terephthalic acid and isophthalic acid were used in a molar ratio of 85:15 and butanediol-1,4 and hexanediol-1,6 were used in a molar ratio of 50:50, and which had a reduced viscosity of 0.95, a glass temperature Tg of 29° C, a melting point of 110° C and a maximum logarithmic damping decrement of 0.79, was ground in suitable grinding apparatus to a powder of a fineness of 60 to 200 μm. The powder was applied to webs of fabric by means of an engraved roller, and was sintered thereon to form drops of fusion adhesive.

The fabric treated in this manner can be bonded to other fabrics in ironing machines in periods of approximately 10 to 15 seconds, at temperatures between 140° C and 160° C, without the loss of the textile character of the laminate. The laminate is resistant to the cleaning agent perchlorethylene which is used in chemical cleaning, and to machine washing at 60° C.

EXAMPLE 7

A copolyester of the invention, in the preparation of which terephthalic acid, isophthalic acid and adipic acid were used in a molar ratio of 80:10:10 and butanediol-1,4 and hexanediol-1,6 were used in a molar ratio of 60:40, and which had a reduced viscosity of 1.03, a glass transition temperature of 17° C, a melting point of 120° C and a maximum logarithmic damping decrement of 1.05 was ground to a fineness of 60–220 μm, and was applied to a fabric as described in Example 6 and bonded to a second fabric by means of an ironing machine. The bond had good strength and withstood chemical cleaning and machine washing up to 60° C.

EXAMPLE 8

(For Purposes of Comparison)

A copolyester in whose preparation terephthalic acid, isophthalic acid and sebacic acid were used in a molar ratio of 43:27:30 and butanediol-1,4 was used as the diol component, and having a reduced viscosity of 0.95, a glass temperature Tg of −8° C, a melting point of 115° C and a maximum logarithmic damping increment of greater than 1.3, was ground under refrigeration with liquid nitrogen to powder of a fineness of 60 to 200 μm. The grinding was very difficult, and the yield of the desired fraction (100 μm) was very low. A fabric laminate as described in Examples 7 and 8 was prepared. Upon soaking in perchlorethylene at room temperature, the bond was dissolved. The copolyester was not suitable for the cementing of textiles that are to be dry-cleaned.

EXAMPLE 9

(For Purposes of Comparison)

A copolyester in whose preparation terephthalic acid and isophthalic acid were used in a molar ratio of 80:20, plus hexanediol-1,6, and having a reduced viscosity of 0.95, a glass temperature of 14° C, a melting point of 120° C and a maximum logarithmic damping decrement of 0.67 was ground to a powder of a fineness of 60 to 200 μm. A laminated fabric was prepared as described in Example 3, but its strength of adhesion was poor. This copolyester is not suitable for the lamination of textiles.

EXAMPLE 10

(For Purposes of Comparison)

A copolyester in whose preparation terephthalic acid and isophthalic acid were used in a molar ratio of 50:50, plus ethylene glycol, and having a reduced viscosity of 0.72 and a glass temperature Tg of 77° C, was not capable of crystallization. A powder of a fineness of 60 to 200 μm prepared from this polyester cannot be ironed at temperatures below 160° C. This copolyester is not suitable for the lamination of fabrics.

EXAMPLE 11

(For Purposes of Comparison)

A copolyester in whose preparation terephthalic acid and isophthalic acid were used in a molar ratio of 50:50 plus ethylene glycol, and which had a reduced viscosity of 0.32 was ground. It could be ground relatively easily, but fabric lamination at 140° C and 150° C was not possible. At 160° C a bond was produced, but the strength of adhesion was only moderate. When soaked in perchlorethylene at room temperature, the bond failed. This material is not suitable for the lamination of textiles.

Tables 1 and 2 list copolyesters of terephthalic acid with ethylene glycol and with butanediol-1,4 which are not prepared in accordance with the invention, listing also their melting point, glass temperature, damping decrement and reduced viscosity.

Table 3 contains a selection of copolyesters of terephthalic acid in accordance with the invention, in which butanediol-1,4 and hexanediol-1,6 were used as the diol component. The coacids used were isophthalic acid, sebacic acid, isophthalic acid and sebacic acid mixtures, and adipic acid.

The tables give the molar percentages which were used in the preparation of the copolyesters.

TABLE 1

| Copolyesters of Terephthalic Acid with Ethylene Glycol | | | | | |
|---|---|---|---|---|---|
| Coacid | Molar % | Melting Point | Glass Temperature | Damping Decrement | $\eta_{red}$ |
| — | — | 260° | 85° | 0.6 | 0.71 |
| Isophthalic | 10 | 236° | 82° | 0.8 | 0.69 |
| Adipic | 10 | 234° | 70° | 0.7 | 0.61 |
| Isophthalic | 20 | 210° | 79° | 0.95 | 0.74 |
| Adipic | 20 | 215° | 50° | 0.8 | 0.81 |
| Isophthalic | 30 | 185° | 76° | 1.2 | 0.72 |
| Adipic | 30 | 188° | 32° | 1.0 | 0.42 |
| Isophthalic | 40 | amorphous | 73° | >1.3 | 0.65 |
| Adipic | 40 | 150° | 16° | >1.3 | 0.72 |
| Adipic | 50 | 115° | +1° | >1.3 | 0.6 |
| Azelaic | 50 | 110° | −8° | >1.3 | 0.38 |
| Adipic | 60 | 70° | −10° | >1.3 | 0.64 |
| Adipic | 70 | amorphous | −20° | >1.3 | 1.02 |
| Azelaic | 70 | amorphous | −29° | >1.3 | 0.77 |

TABLE 1-continued
Copolyesters of Terephthalic Acid with Ethylene Glycol

| Coacid | Molar % | Melting Point | Glass Temperature | Damping Decrement | $\eta_{red}$ |
|---|---|---|---|---|---|
| Adipic | 100 | 39° | −28° | 0.45 | 0.64 |
| Azelaic | 100 | 35° | −41° | 0.50 | 0.75 |
| Isophthalic | 100 | amorphous | +72° | >1.3 | 0.52 |

TABLE 2
Copolyesters of Terephthalic Acid with Butanediol-1,4

| Coacid | Molar % | Melting Point | Glass Temperature | Damping Decrement | $\eta_{red}$ |
|---|---|---|---|---|---|
| — | 0 | 225° | 55° | 0.36 | 0.71 |
| Isophthalic | 10 | 210° | 50° | 0.45 | 0.65 |
| Adipic | 10 | 212° | 45° | 0.4 | 0.71 |
| *Dim.Fatty Acid | 10 | 210° | 45° | 0.45 | 0.61 |
| Azelaic | 10 | 210° | 40° | 0.4 | 0.75 |
| Isophthalic | 15 | 200° | 45° | 0.57 | 0.66 |
| Adipic | 15 | 204° | 40° | 0.58 | 0.84 |
| Isophthalic | 20 | 193° | 45° | 0.7 | 0.71 |
| Adipic | 20 | 196° | 30° | 0.6 | 0.68 |
| Dim.Fatty Acid | 20 | 194° | 30° | 0.7 | 0.92 |
| Azelaic | 25 | 181° | −3° | 0.47 | 0.53 |
| Isophthalic/Adipic mixture | 10/15 | 190° | 10° | 0.6 | 0.68 |
| Isophthalic | 30 | 172° | 38° | 0.8 | 0.72 |
| Adipic | 30 | 174° | −2° | 0.7 | 0.69 |
| Azelaic | 30 | 169° | −8° | 0.6 | 0.58 |
| Dim.Fatty Acid | 30 | 171° | −3° | 0.7 | 0.65 |
| Isophthalic/Sebacic mixture | 10/20 | 167° | 8° | 0.6 | 0.56 |
| Sebacic mixture | 20/10 | 174° | 22° | 0.65 | 0.58 |
| Isophthalic | 35 | 167° | 35° | 0.9 | 0.72 |
| Adipic | 35 | 163° | −8° | 0.75 | 0.71 |
| Isophthalic/Azelaic mixture | 20/15 | 165° | 20° | 0.85 | 0.68 |
| "/Sebacic mixt. | 10/25 | 161° | 0° | 0.75 | 0.75 |
| Adipic | 40 | 152° | −15° | 0.80 | 0.44 |
| Isophthalic | 50 | 125° | 35° | >1.3 | 0.72 |
| "/Sebacic mixt. | 20/30 | 120° | −8° | >1.3 | 0.70 |
| "/Azelaic mixt. | 20/30 | 115° | −8° | >1.3 | 0.68 |
| "/Azelaic mixt. | 30/30 | 95° | −10° | >1.3 | 0.65 |
| "/Azelaic mixt. | 20/40 | 90° | −23° | >1.3 | 0.62 |
| "/Azelaic mixt. | 33/33 | 67° | −11° | >1.3 | 0.69 |
| "/Sebacic mixt. | 33/33 | 69° | −12° | >1.3 | 0.81 |
| Azelaic | 75 | 50° | −32° | =1.3 | 0.92 |
| Isophthalic/Azelaic mixture | 50/25 | 60° | −5° | >1.3 | 0.71 |
| Isophthalic/Azelaic mixture | 25/50 | 53° | −29° | >1.3 | 0.75 |
| Adipic | 100 | 54° | −38° | 0.27 | 0.74 |
| Azelaic | 100 | 46° | −38° | 0.3 | 0.44 |
| Sebacic | 100 | 56° | −46° | 0.2 | 1.06 |
| Isophthalic | 100 | 140° | 31° | 1.2 | 0.71 |

*aliphatic dibasic acid having 36 carbon atoms, commercially obtainable under the name "Empol".
NOTE: "Dim." in the above table is an abbreviation of "dimerized".

TABLE 3
Copolyesters of Terephthalic Acid with Mixtures of Butanediol-1,4 and Hexandiol-1,6

| Coacid | Molar % | BD1,4 HD1,6 | Melting Point | Glass Point | Damping Decrement | $\eta_{red}$ |
|---|---|---|---|---|---|---|
| —* | — | 80/20 | 171° | 38° | 0.44 | 0.76 |
| —* | — | 60/40 | 135° | 30° | 0.55 | 0.70 |
| — | — | 50/50 | 123° | 29° | 0.63 | 0.60 |
| — | — | 40/60 | 125° | 28° | 0.61 | 0.72 |
| —* | — | 0/100 | 143° | 25° | 0.38 | — |
| Isophthalic | 5 | 50/50 | 114° | 29° | 0.65 | 0.81 |
| " | 10 | 50/50 | 111° | 29° | 0.71 | 0.78 |
| " | 15 | 50/50 | 106° | 29° | 0.79 | 0.92 |
| " | 20 | 50/50 | 97/104° | 25° | 0.85 | 0.86 |
| " | 30 | 50/50 | 83/80° | 19° | 1.15 | 1.01 |
| " | 50 | 50/50 | 51/44° | 13° | >1.3 | 0.68 |
| "* | 10 | 90/10 | 193° | 45° | 0.49 | 0.71 |
| "* | 20 | 90/10 | 172° | 41° | 0.72 | 0.83 |
| "* | 30 | 90/10 | 166° | 37° | 0.85 | 0.63 |
| " | 50 | 90/10 | 121° | 30° | 1.3 | 0.78 |
| " | 40 | 80/20 | 115° | 28° | >1.22 | 0.87 |
| " | 20 | 70/30 | 135° | 25° | 0.81 | 0.92 |
| " | 40 | 70/30 | 100° | 21° | >1.3 | 0.62 |
| " | 30 | 66/33 | 111° | 22° | 1.19 | 0.52 |
| " | 20 | 55/45 | 106° | 29° | 0.84 | 0.65 |
| " | 20 | 40/60 | 103° | 27° | 0.86 | 0.60 |
| " | 10 | 35/65 | 113° | 26° | 0.69 | 0.78 |
| " | 20 | 30/70 | 101° | 25° | 0.87 | 0.55 |
| " | 40 | 30/70 | 72° | 16° | 1.28 | 0.67 |
| " | 10 | 25/75 | 120° | 22° | 0.61 | 0.63 |
| Sebacic | 10 | 50/50 | 110° | 19° | 0.66 | 0.72 |
| Sebacic | 30 | 80/20 | 125° | −8° | 0.81 | 0.65 |
| Isophthalic/Sebacic mixt. | 25/20 | 50/50 | 53° | −5° | >1.3 | 0.83 |
| Adipic | 10 | 50/50 | 115° | 23° | 0.67 | 0.88 |
| Adipic | 20 | 50/50 | 102° | 14° | 0.72 | 0.90 |
| Adipic | 30 | 50/50 | 82° | 2° | 0.92 | 0.81 |

*Not according to the invention

What is claimed is:

1. A linear saturated crystalline polyester of an acid moiety and a moiety of a dihydric alcohol, at least 40 mol percent of the acid moiety being a terephthalic acid moiety, said polyester containing as moieties of the dihydric alcohol moieties of 1,4-butanediol and 1,6-hexanediol, the ratio of the 1,4-butanediol moieties to 1,6-hexanediol moieties being 10:90:–90:10, said polyester being further characterized by:
   A. a glass transition temperature of −10° C to +30° C;
   B. a melting point of 40°–130° C;
   C. a difference between the glass transition temperature and the melting being equal to or less than 100° C;
   D. a maximum logarithmic damping decrement from 0.6 to >1.3; and
   E. a reduced viscosity, measured on a 1 wt.-% solution in a 60–40 mixture of phenol and 1,1,2,2-tetrachloroethane, of 0.5 to 1.5.

2. A polyester according to claim 1 wherein up to 50 mol percent of the acid moieties are acid moieties other than terephthalic acid moieties.

3. A polyester according to claim 2 wherein the polyester contains moieties of isophthalic acid.

4. A polyester according to claim 2 wherein the polyester contains moieties of azelaic acid.

5. A polyester according to claim 2 wherein the polyester contains moieties of adipic acid.

6. A polyester according to claim 2 wherein the polyester contains moieties of sebacic acid.

7. A polyester according to claim 1 wherein the mol ratio of 1,4-butanediol to 1,6-hexanediol is 80:20 to 40:60.

8. A polyester according to claim 7 wherein the polyester has a crystallinity of at least 1%.

9. A polyester according to claim 7 wherein the polyester additionally contains moieties of a third dihydric alcohol, in an amount of up to 20 mol% based upon the total diol compound said third dihydric alcohol being a saturated aliphated diol having 2 to 12 carbon atoms.

10. A polyester according to claim 9 wherein said third dihydric alcohol is selected from a group consisting of ethylene glycol, propanediol-1,3, pentanediol-1,5 and neopentyl glycol.

11. A polyester according to claim 7 wherein said polyester is free of moieties of another dihydric alcohol.

12. A polyester according to claim 7 wherein the polyester additionally contains moieties of a second acid, said acid being a saturated aliphatic dicarboxylic acid having 4 to 34 carbon atoms between the carboxylic acid groups.

13. A polyester according to claim 1 wherein the polyester has a melt viscosity between 100 and 20000 poises.

14. A polyester according to claim 13 wherein the melt viscosity is 300–10000 poises.

15. A polyester according to claim 13 having a melting point below 130° C.

16. A polyester according to claim 1 having a reduced viscosity of 0.7 to 1.2.

17. In a process for securing one substrate to another by disposing between said substrates a heat-fusible material and maintaining the substrates in sufficient juxtaposition until said material has fused and bond one of said substrates to the other, the improvement which comprises employing a heat-fusible material of the polyester of claim 1.

18. In a process for securing one substance to another by disposing between said substances a heat-fusible material and maintaining the substances in sufficient juxtaposition until said material has fused and bond one of said substances to the other, the improvement which comprises employing a heat-fusible material of the polyester of claim 2.

19. In a process for securing one substance to another by disposing between said substances a heat-fusible material and maintaining the substances in sufficient juxtaposition until said material has fused and bond one of said substances to the other, the improvement which comprises employing a heat-fusible material of the polyester of claim 7.

20. A process according to claim 12 wherein the polyester is disposed between said substances in the form of a molten heated mass.

21. A process according to claim 12 wherein the polyester is disposed between said substances in the form of a solid and thereafter is subjected to sufficient temperature and pressure to join said substances.

22. A process according to claim 12 wherein at least one of said substances is a textile substance.

23. A process according to claim 12 wherein at least one of said substances is a natural or artificial leather.

24. A process according to claim 12 wherein said polyester is disposed between a shoe lining material and a shoe upper material and in such position is subjected to sufficient temperature and pressure to join said lining material to said shoe upper material.

* * * * *

UNITED STATES PATENT AND TRADEMARK OFFICE
CERTIFICATE OF CORRECTION

PATENT NO. : 4,094,721
DATED : June 13, 1978
INVENTOR(S) : Sturm et al.

It is certified that error appears in the above-identified patent and that said Letters Patent are hereby corrected as shown below:

Column 1, line 59, "80:30" should be -- 80:20 --.

Column 2, line 7, "usuable" should read -- unusable --.

Column 3, line 2, "in sole" should read -- insole --.

Column 3, lines 33-34, "of 1,6-" should read -- to 1,6- --.

Signed and Sealed this

Twenty-seventh Day of February 1979

[SEAL]

Attest:

RUTH C. MASON
Attesting Officer

DONALD W. BANNER
Commissioner of Patents and Trademarks